United States Patent [19]

Bolger

[11] 4,361,849

[45] Nov. 30, 1982

[54] VIDEO DISC VARI-SPEED PLAYBACK SYSTEM

[75] Inventor: Thomas V. Bolger, Merchantville, N.J.

[73] Assignee: RCA Corporation, New York, N.Y.

[21] Appl. No.: 204,761

[22] Filed: Nov. 6, 1980

[51] Int. Cl.³ .............................................. H04N 5/76
[52] U.S. Cl. .................................. 358/312; 360/10.1; 358/327; 358/342
[58] Field of Search .................. 358/128.5, 128.6, 127, 358/8, 4; 360/10, 33; 369/43, 50, 111, 47, 60, 30, 32

[56] References Cited

U.S. PATENT DOCUMENTS

| | | | |
|---|---|---|---|
| 3,548,095 | 12/1970 | Poulett | 178/6.6 |
| 3,748,381 | 7/1973 | Strobele et al. | 178/6.6 |
| 4,133,009 | 1/1979 | Kittler et al. | 360/9 |
| 4,159,480 | 6/1979 | Tachi | 358/8 |
| 4,183,059 | 1/1980 | Palmer | 358/128 |

OTHER PUBLICATIONS

S. K. Kim, "VIR II System", IEEE Trans., Con. Elec., vol. CE-24, No. 3, Aug. 78, pp. 200-208.

Primary Examiner—Alan Faber
Attorney, Agent, or Firm—E. M. Whitacre; J. S. Tripoli; E. P. Herrmann

[57] ABSTRACT

A video disc player has two fields of buffer storage for implementing special effects. Video signal recovered from a disc record is directed into respective ones of the buffer stores for subsequent replay in particular sequences. A fixed memory device, containing a plurality of sequences of preprogrammed data words, each sequence defining a particular player function, controls the operable mode of the respective buffer storage devices. The preprogrammed sequences are addressed by a binary counter responsive to the vertical synchronization components of signal recovered from the disc record. Particular variable speed display options are effectuated by the repeated playback of selected TV fields and the omission of intervening fields.

13 Claims, 6 Drawing Figures

| RATIO | FIELD REPEATS | FIELD INCREMENT | PICKUP TRANSDUCER TRANSLATION | | | FIELD DISPLAY PATTERN |
|---|---|---|---|---|---|---|
| | | | # KICKS | # TRACKS | # REV | |
| SLOW FORWARD (TV) | | | | | | |
| 2:1 | 6 | 3 | 1R | 1 | 2 | 1,1,1,1,1,4,4,4,4,4,7,7,7,7,7,10,10,... |
| 3:1 | 6 | 2 | 2R | 1 | 3 | 1,1,1,1,1,3,3,3,3,3,5,5,5,5,5,7,7,... |
| 5:1 | 5 | 1 | 4R | 1 | 5 | 1,1,1,1,1,2,2,2,2,2,3,3,3,3,3,4,4,... |
| 9:1 | 9 | 1 | 8R | 1 | 9 | 1,1,1,1,1,1,1,1,1,2,2,2,2,2,2,2,2,3,... |
| 25:1 | 25 | 1 | 8R | 3 | 25 | 1,1,--(21)--1,1,2,2,--(21)--2,2,3,3,... |
| FAST FORWARD (TV) | | | | | | |
| 2:1 | 2 | 4 AVG. | 2F 1R | 1 | 1 | 1,1,5,5,10,10,14,14,17,17,21,21,... |
| 3:1 | 2 | 6 | 1R 2F 1R 2F | 1 | 1 | 1,1,7,7,13,13,19,19,25,25,... |
| 5:1 | 2 | 10 | 4F | 1 | 1 | 1,1,11,11,21,21,31,31,... |
| 25:1 | 1 | 25 | 8F | 3 | 1 | 1,26,51,76,101,... |
| SLOW REVERSE (TV) | | | | | | |
| 1:1 | 2 | 2 | 1R | 1 | 0.5 | 12,12,10,10,8,8,6,6,4,4,... |
| | | | | | # FIELDS | |
| 2:1 | 4 | 2 | 3R | 1 | 16 | 10,10,10,10,8,8,8,8,6,6,6,6,4,... |
| 3:1 | 3 | 1 | 1R | 1 | 6 | 10,10,10,9,9,9,8,8,8,... |
| 4:1 | 4 | 1 | 2R | 1 | 13 | 10,10,10,10,9,9,9,9,8,... |
| 15:1 | 15 | 1 | 2R | 1 | 15 | 10,10,--(11)--10,10,9,9,--(11)--9,9,8,8,... |
| FAST REVERSE (TV) | | | | | | |
| | | | | | # REV | |
| 2:1 | 2 | 4 AVG. | R1,R1,R2,F1 | | 1 | 25,25,25,21,21,18,18,14,14,9,9,5,2,... |
| 3:1 | 1 | 3 | F1,R2,F1,R2,F1,R2,F1,R2,F1,R2/REV | | | 25,22,19,16,13,10,7,4,1 |
| 5:1 | 2 | 10 | F1,R4,F1,R4, | | 1 | 49,49,39,29,29,19,19,9 |
| 15:1 | 1 | 15 | 8R | 2 | 1 | 49,34,19,4,-11,-26,... |

Fig. 3

| SEQUENCE NO. | ADDRESS | CHROMA INVERT YES = 1, NO = 0  $2^0$ | DISPLAY MEM. A = 1, B = 0  $2^1$ | RECORD YES = 1, NO = 0  $2^2$ | RECORD MEM. A = 1, B = 0  $2^3$ | TRANSLATE STYLW YES = 1, NO = 0  $2^4$ | TRANSLATE DIR FWD = 1, REV = 0  $2^5$ | END SEQUENCE YES = 1, NO = 0  $2^6$ | | FIELD DISPLAYED | FIELD ADDRESSED |
|---|---|---|---|---|---|---|---|---|---|---|---|
| | | | | NORMAL REVERSE 1:1 | | | | | | | |
| 1 | 1010 0000 | 0 | 0 | 1 | 1 | 1 | 0 | 0 | | 14 | 10 |
| 2 | 1010 0001 | 0 | 0 | 0 | 0 | 0 | 0 | 0 | | 14 | 11 |
| 3 | 1010 0010 | 0 | 0 | 1 | 0 | 0 | 0 | 0 | | 12 | 12 |
| 4 | 1010 0011 | 0 | 0 | 0 | 0 | 0 | 0 | 0 | | 12 | 13 |
| 5 | 1010 0100 | 0 | 1 | 1 | 0 | 1 | 0 | 0 | | 10 | 6 |
| 6 | 1010 0101 | 0 | 1 | 0 | 0 | 0 | 0 | 0 | | 10 | 7 |
| 7 | 1010 0110 | 0 | 1 | 1 | 1 | 0 | 0 | 0 | | 8 | 8 |
| 8 | 1010 0111 | 0 | 1 | 0 | 0 | 0 | 0 | 1 | | 8 | 9 |
| 9 | 1010 0000 | 0 | 0 | 1 | 1 | 1 | 0 | 0 | | 6 | 2 |
| 10 | 1010 0001 | 0 | 0 | 0 | 0 | 0 | 0 | 0 | | 6 | 3 |
| | | | | SLOW REVERSE 3:1 | | | | | | | |
| 1 | 1100 0000 | 1 | 1 | 1 | 0 | 0 | 0 | 0 | | 11 | 9 |
| 2 | 1100 0001 | 0 | 1 | 1 | 1 | 0 | 0 | 0 | | 10 | 10 |
| 3 | 1100 0010 | 1 | 1 | 0 | 0 | 0 | 0 | 0 | | 10 | 11 |
| 4 | 1100 0011 | 1 | 1 | 0 | 0 | 1 | 0 | 0 | | 10 | 4 |
| 5 | 1100 0100 | 1 | 0 | 0 | 0 | 0 | 0 | 0 | | 9 | 5 |
| 6 | 1100 0101 | 0 | 0 | 0 | 0 | 0 | 0 | 0 | | 9 | 6 |
| 7 | 1100 0110 | 1 | 0 | 1 | 1 | 0 | 0 | 0 | | 9 | 7 |
| 8 | 1100 0111 | 0 | 0 | 1 | 0 | 0 | 0 | 0 | | 8 | 8 |
| 9 | 1100 1000 | 1 | 0 | 0 | 0 | 0 | 0 | 0 | | 8 | 9 |
| 10 | 1100 1001 | 1 | 0 | 0 | 0 | 1 | 0 | 0 | | 8 | 2 |
| 11 | 1100 1000 | 0 | 0 | 0 | 0 | 0 | 0 | 0 | | 7 | 3 |
| 12 | 1100 1011 | 0 | 1 | 0 | 0 | 0 | 0 | 1 | | 7 | 4 |

| TV FIELD | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| FILM FRAME | 1 | | 2 | | 3 | | 4 | | 5 | | | 6 | | 7 | | | 8 | | 9 | | | 10 | | | |

Fig. 6

| RATIO | FIELD REPEAT | FRAME (FILM) INCREMENT | TRANSLATION | DISPLAY PATTERN |
|---|---|---|---|---|
| | | | SLOW FORWARD (FILM) | |
| 1.6:1 | 4 | 1 | 3R of 1T/5 REV | 1,1,1,1,5,5,5,5,5,6,6,6,6,9,9,9,9,11,11,... |
| 2.8:1 | 7 | 1 | 9R of 1T/14 REV | 1,2,1,2,1,2,2,5,5,5,3,4,3,4,6,7,6,7,6,7,10,10,... |
| 4.2:1 | 10,11 | 1 | 16R of 1T/21REV | 1,2,1,21,2,1,2,3,4,5,4,3,4,5,4,3,4,5,6,7,6,7,... |
| | | | FAST FORWARD (FILM) | |
| 3:1 | 4 | 5 | 2F of 1T/REV | 1,1,1,1,13,13,13,13,25,25,25,25,37,... |
| 5:1 | 1 | 2 | R2,F3,R2,F3,R2,F3,R2,F3/REV | 1,6,11,16,21,26,31,36 |
| 9:1 | 1 | 9 | 4F of 2T/REV | 1,2,19,20,37,38,55,56,... |
| 13:1 | 1 | 13 | 4F of 3T/REV | 1,2,27,28,53,54,... |

VIDEO DISC VARI-SPEED PLAYBACK SYSTEM

This invention relates to video disc playback systems and in particular to a system for recovering and displaying information at varying rates such as speed up motion, or slow reverse motion for example, from a disc record whereon multiple frames of video signal are recorded per circular track or track convolution.

To produce variable speed playback, VSP, from recorded media, individual fields or frames of video signal must be repeated or skipped to create the illusion of faster or slower movement of recorded motion. This is a requirement imposed by the display apparatus being a conventional television receiver which operates on a standard signal format. Recorded fields or frames of video signal from the disc record can be skipped or repeated and sequentially transmitted to the receiver while maintaining a proper signal format and giving the appearance of altered motion. Were the speed of the record playback mechanism varied to alter playback speed, the signal format would be altered and incompatible with the receiver.

Video disc systems which have video signals recorded on a frame per circular track or convolution basis can effect slow or fast motion by controlling the radial position of the signal pickup transducer for replaying or skipping information tracks respectively. Skipping information tracks causes the signal sequence recovered to occur in less than real time and thereby gives the appearance of speeded up motion. Replaying each consecutive track a predetermined number of times, e.g., 3, causes a given recovered signal sequence to appear to be slowed down, e.g., by 3:1.

Video disc systems which have multiple frames of video signal recorded per convolution are not susceptible of completely satisfying results in terms of variable speed playback by the foregoing technique. It is easily appreciated that replaying a particular track, having a number of video frames recorded per track, will repeatedly produce a small segment of the forward motion recorded rather than a slowed sequence of continued motion. The action will return to a particular starting point and advance by the number of frames contained in the track, then jump back to the starting point and repeat the action for each replay of the track. The result is a noncontinuous slowed display of the recovered signal. Continuous reverse motion cannot be fully realized by translating the signal pickup transducer in a backward track to track sequence as the exhibited signal will contain complete segments of forward going motion in a backward sequence, i.e., the picture will progress forward by a one track segment, then jump backward two or more tracks, go forward again by one track and jump backward two or more tracks, etc. As in the slow speed mode, the reproduced video will appear to have noncontinuous, jerky motion on the display.

The present invention overcomes these shortcomings to produce a video disc player having a relatively high degree of variable speed playback versatility for a player designed to recover signal from disc records having a plurality of video signal frames per circular track or convolution of a spiral track.

The invention incorporates within a disc record player a buffer memory with a capacity to store two TV fields of video signal, each field memory location being capable of accepting and outputting video signal simultaneously and in synchronism with the vertical rate of playback. The function of the particular buffer memory field, e.g., to accept data, to output data, idle, etc., and the position of the signal pickup transducer are determined by control circuitry preprogrammed with respective sets of control sequences for each of the desired variable display speed options provided in the player.

A preprogrammed permanent memory device contains control words arranged in particular sequences with the address locations of each word in a particular sequence arranged consecutively. Each of the sequences conditions or controls the VSP to perform a particular play option. The most significant bits of the address location are provided by the user requesting a particular function on a control panel. The lessor significant bits of the control word address locations are generated by a binary counter which increments at the field rate to automatically step through a given sequence.

Each bit of the respective control words provided at the output of the permanent memory are applied to control various elements of the VSP circuitry. One bit directs the signal recovered from the disc record to one or the other of the field memories for temporary storage. Another bit selects the field memory from which signal will currently be displayed. Third and fourth bits respectively determine the direction and occurrence of signal pickup transducer excursions. A fifth bit in the control word determines whether a particular field is to have its chrominance signal phase angle changed by 180 degrees. A further bit determines when the sequence counter should be reset to repeat the control sequence, etc.

The invention will be more readily understood from the following detailed description in conjunction with the accompanying drawings.

In the drawings:

FIG. 3 is a tabular form of possible player display options from a disc recorded with TV source material showing the pattern of displayed fields;

FIG. 4 is a tabular form of two particular program control sequences;

FIG. 5 indicates the relationship of film frames to TV field increments; and

FIG. 6 is a tabular form of possible player display options from signal derived from a disc record which was recorded from film source material.

Figure 1:
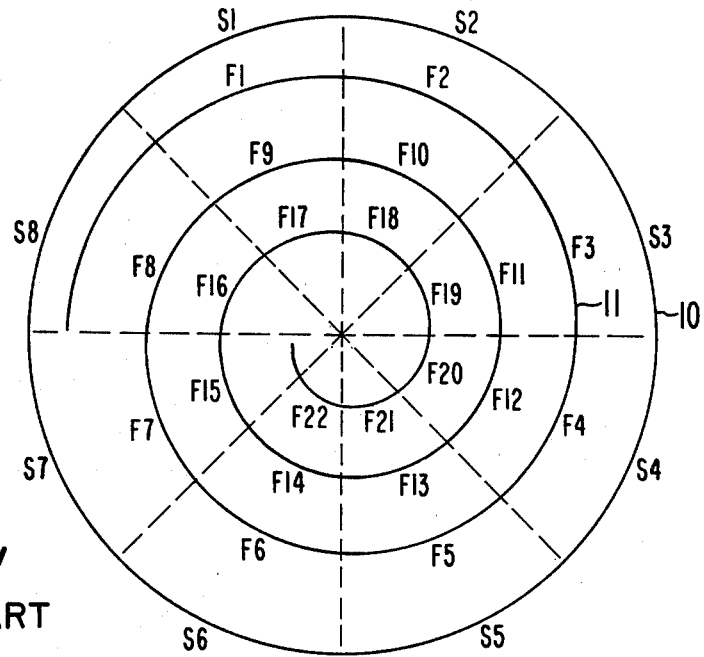
FIG. 1 is a schematic diagram of a disc record having a spiral information track containing 8 TV fields of signal information per 360° of track length.

In FIG. 1 a disc record 10 has a spiral information track 11 in which signal is recorded in a substantially standard TV format. The disc is divided into sectors S1-S8, the sectors dividing each convolution of the information track into 8 signal segments, each segment containing one field of TV signal including vertical and horizontal synchronization signals. Consecutive fields F1-FN of TV signal are arranged in ascending order in the spiral track so that a track following signal pickup transducer can recover the signal in a normal sequence for display purposes. The vertical synchronization signals occur at the same angular coordinates in each track and are typically located at the beginning at each sector. In addition to the normal TV signals, the recorded signal may include field, frame and track identification information as auxilliary signals piggybacked in the vertical blanking intervals (see, for example, U.S. Pat.

No. 4,159,480 issued to K. Tachi entitled "Method of Inserting an Address Signal in a Video Signal".)

Figure 2:
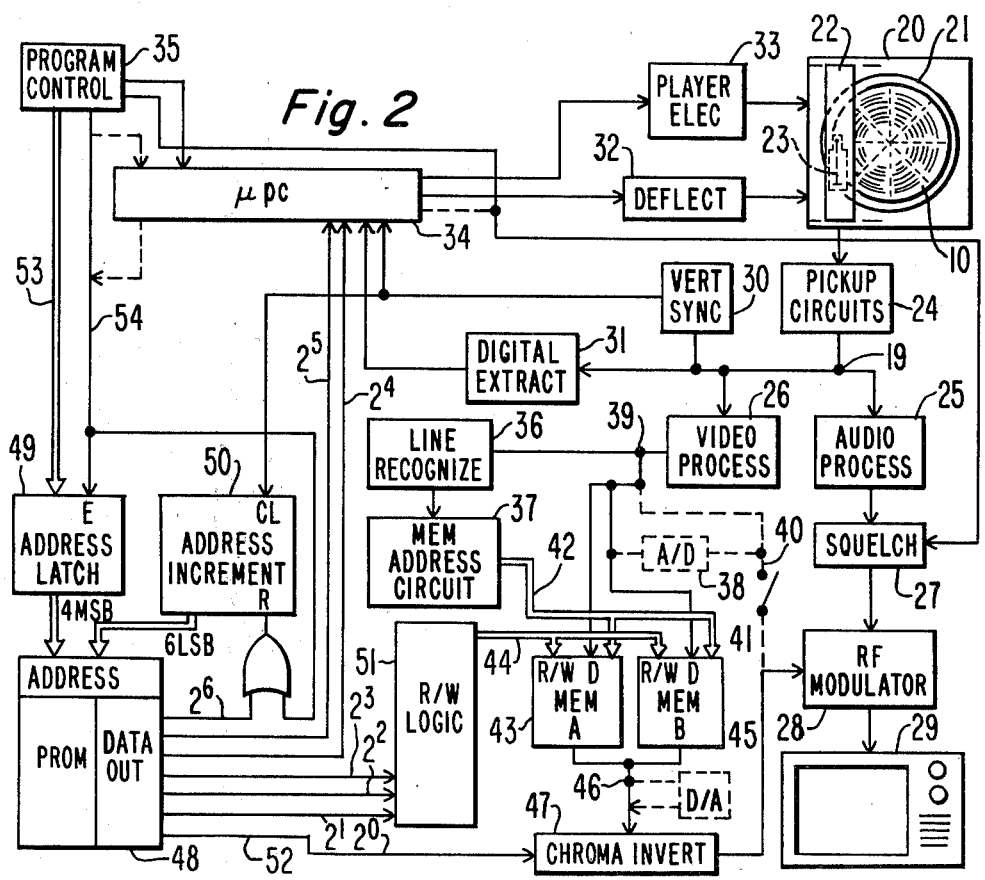
FIG. 2 is a block diagram of a video disc player embodying the present invention.

The disc record player 20 shown in FIG. 2 includes a rotatable base 21 for supporting and rotating a disc record such as the aforedescribed disc record 10 at a constant angular velocity. A carriage assembly 22 supports a signal pickup transducer 23 and radially translates it across the disc record in consonance with the radial speed of signal recovered from the record. The signal pickup transducer traces the information track on the disc record and cooperating with the pickup circuitry 24 recovers the recorded signal to produce an electrical manifestation of the recorded signal at connection 19.

Included in the carriage mechanism is a pickup transducer deflection or steering apparatus responsive to energization signals provided in the deflection circuitry 32 for radially translating the pickup transducer abruptly inward or outward over one or more track convolutions. An example of such a deflection apparatus is described in U.S. Pat. No. 4,183,059 entitled "Track Skipper For a Video Disc Player" which is incorporated herein by reference.

Recovered signal from the pickup circuitry 24 is processed in the video processing circuitry 26 and the audio processing circuitry 25 and ultimately applied to an RF modulation circuit 28 which conditions the recovered signal for transmission to the antenna terminals of a standard TV receiver. The audio signal is recorded for normal speed forward playback of the disc record. Variations in playback mode will cause the recovered audio to be incoherent and objectionable. Thus, an audio squelch circuit 27 responsive to control signal from the player program control console 35 is provided to inhibit the audio signal whenever the recovered signal occurs in a nonstandard format.

The mechanical operation of the player mechanism 20 is subordinate to the player electronics 33 responsive to control signals generated in the microprocessor 34. Deflection circuitry 32 is also responsive to microprocessor generated signals. The microprocessor 34 operates by virtue of internal preprogrammed routines and signals generated by the selection of player options by the user at the player program control console 35. The microprocessor is also responsive to the information contained in the auxilliary signals recorded with the video signal. The auxilliary signals are extracted from the recovered video by the circuitry 31 which converts such signals to standard digital signals for use by the microprocessor. By virtue of track identification information contained in the auxilliary signals, the microprocessor can monitor the progression of the pickup transducer and is programmed to induce radial translations of the pickup transducer through the deflector mechanism in response to anomalous sequences of track identification numbers and thereby correct the position of the transducer. Circuitry 30 extracts the vertical synchronization components of the recovered signal, which synchronization signals are applied to synchronize particular control functions of the microprocessor.

To effect other than a normal signal display sequence from a player recovering signal from a disc having multiple TV frames (2 fields constituting one frame) per convolution of the information track, requires that segments of the signal be stored for subsequent display. This is a consequence of (a) a requirement that there be relative motion between the disc and signal pickup transducer in order to recover signal from the disc (relative motion being provided by disc rotation), and (b) the position of the pickup transducer being substantially fixed and not readily translated to fields other than those in adjacent tracks proximate the current position of the transducer which fields are displaced in normal sequence by multiples of 8 fields. Thus, in order to produce the appearance of a contiguous sequence, selected fields must be snatched from the record when the pickup transducer or stylus is addressing such selected field, and signal from those fields must be stored for subsequent composition in the desired display sequence. To further illustrate the problem, consider creating a display sequence where the motion appears to be slowed by a factor of five. One method of achieving such slowdown is by repeating Field 1 five times, then repeating Field 2 five times, etc. But, the signal pickup transducer traces Fields 1, 2, 3, 4, etc. in immediate succession, thus it is not possible to repeatedly display Field 1 without storing the information in an ancillary storage means from which the signal can be accessed for consecutive replay of that field five times. Note further that on completion of the fifth consecutive display of Field 1 the disc rotation has advanced the pickup transducer to the Field 6 position (see FIG. 1) and is not in position to recover signal from the desired Field 2. Therefore display of Field 2 subsequent to five consecutive displays of Field 1 can be accomplished only if Field 2 were recovered and stored in a second storage means when the pickup transducer was positioned at Field 2 immediately subsequent to the recovery of the Field 1 signal. After five consecutive displays of Field 2 the track-pickup transducer relationship is at the beginning of Field 11 (F11) which field is adjacent and parallel to Field 3 (F3). Field 3 can be accessed simply by translating the signal pickup transducer radially outwardly by one convolution, during the vertical synchronization interval. Field 3 is recovered, displayed and concurrently stored in one of the first or second storage means to be available for the four additional Field 3 display periods. FIG. 3 indicates a number of player options which can be realized in a player of the type for recovering signal from discs having 8 TV fields per convolution and which incorporates two fields of auxilliary buffer storage and a transducer for steering the signal pickup transducer from track to track. The options indicated in FIG. 3 assume that the recorded information is from TV source material, i.e., that each frame comprises two distinct time displaced fields of signal information. In the figure, the column denoted ratio denotes the factor by which the apparent motion displayed is increased or decreased; "Field Repeats" denotes the number of times each selected field is displayed; "Field Increment" is the number of fields by which the displayed field number is incremented; "# Kicks" indicate the number of times and the direction (F for forward, R for reverse) the signal pickup transducer is radially translated per the number of disc revolutions (# Rev); "# Tracks" indicates the number of tracks the signal pickup is translated per translation; and the "Field Display Pattern" indicates the fields selected for display and the succession of field display.

FIG. 3 indicates that the display options are performed by operating on a field by field basis rather than a frame by frame basis. Such application reduces the vertical resolution of the display but not to the extent that it is readily noticeable or objectionable to the average viewer. The creation of apparent variable display speed options on the field rather than a frame basis permits a greater range of versatility with less storage required. Also, if more than 1 field were repeated, e.g., 1, 2, 1, 2 to improve vertical resolution, there would be motion displayed even for normal speed movements (body motion etc.). This is apparent in disc systems employing two fields per revolution that are repeated. Consecutively produced fields are conditioned for normal interlacing, thus, for example, in the 2:1 slow forward mode, the second, fourth and sixth occurrences of Field 1 are respectively interlaced with the first, third, and fifth occurrences of Field 1. In addition, since the phase angle of the chrominance component of the video signal is normally displaced by 180 degrees for two adjacent fields every four consecutive fields of NTSC standard TV signal it is necessary to provide such phase inversion in the appropriate repeated display of a particular field.

Referring again to FIG. 2, first and second buffer storage elements (41, 43) are arranged to accept video signal from the output connection 39 of the video processor 26. The storage devices may be any of a variety of types of memory devices. For example, they may be analog storage devices in the form of charge transfer devices, CTD's, such as charge coupled devices, CCD's, or bucket brigade devices, BBD's. Alternatively, the memory storage may be digital in nature realized in semiconductor random access, RAM, or serial arrays. Implementation of buffer storage with digital memory, however, requires the interposition of an analog-to-digital converter 38 between the memory input terminal and the video processor output terminal 39 and the interposition of a digital-to-analog 45 converter between the output terminal 46 of the memory devices and the RF modulator 28. Ideally the respective memory devices should be capable of accepting a new field of information while it is outputting a previously stored field. Read/write circuitry 51 controls the operable modes of the respective storage devices via control bus 44, i.e., circuitry 51 conditions the respective memories to either accept new data, output stored data or output stored data while simultaneously accepting new data. Output signals from the storage devices 41 and 43 are applied to circuitry 47 which selectively inverts the phase of the chrominance signal responsive to control signals on connection 52.

A fixed memory device 48 such as a read only memory, a programmable read only memory, etc., contains preprogrammed data words, each word comprising 7 bits, $2^0$–$2^6$, respectively. The data words are arranged in sequential address locations according to the respective variable display speed option. A player option is effected by successively outputting the data words of a particular sequence at the TV field rate and utilizing respective ones of the data word bits as signals for controlling the read/write, chrominance inverter and pickup transducer steering circuitry. In the drawing the respective data bits of the data words are available at the fixed memory output connections $2^0$–$2^6$. The $2^0$ data word bit controls the chrominance inverter. The $2^1$–$2^3$ data word bits control the read/write circuitry 51. Three read/write control bits provide at least eight different combinations of read and write memory operations. Data word bits $2^4$–$2^5$ are applied as inputs to the microprocessor for prompting signal pickup deflection.

The data words are successively output onto the connections $2^0$–$2^6$ in the following manner. Each data word of a sequence defining a function resides at an address location defined by an address number (10 bit binary number, for example). The six least significant bits of the address locations of consecutive data words in a data word sequence are arranged in ascending order. The 4 most significant bits of the address locations for every data word in a particular sequence are the same and identify the sequence. The user dials into the program controller 35 the desired player function. The program controller 35 produces a 4 bit binary manifestation of the user entered function onto the data bus 53. Upon the occurrence of an enable signal produced on connection 54 by virtue of a direct user command entered in the program controller or synchronized through the microprocessor 34, the 4 bit binary manifestation of the user function is entered into the latch 49 having output connections attached to the four most significant bits of the fixed memory address circuitry 48. A counter 50, has six parallel output terminals connected to the six least significant bits of the fixed memory address circuitry. The enable signal on connection 54 resets the counter to zero simultaneously with the most significant address bits being applied to the memory address circuitry so that the entire address of the first data word of a given sequence is concurrently applied. The binary number present at the counter 50 parallel output terminals is incremented in response to the vertical synchronizing pulses from the recovered signal. The counter output signals step through the consecutive address locations at the field rate thereby advancing the system through a data word sequence to perform a particular function. The $2^6$ bit of the last data word indicates the completion of a sequence and this signal on the $2^6$ bit connection resets the address counter starting a further iteration of the sequence.

Information is routed into the particular storage location of the respective storage buffers 41 and 43 by the memory address circuitry 37. The circuitry 37 may be a gated oscillator circuit if the storage devices are realized with serial memory elements. Alternatively, if the storage buffers are RAM's, then circuitry 37 may be binary counters to sequentially step through the memory locations. The memory address circuitry is synchronized by the recognition circuit 36 responsive to synchronization signals from the currently recovered signal.

In order to effect field interlacing without having to account for the initial half horizontal line of video signal of the odd fields in an NTSC video signal, the system ignores the half lines. More precisely, the storage buffers store an integral number of horizontal lines starting with an arbitrary line number, line 5, for example. Those skilled in the television arts will realize that the first 21 horizontal lines of each field do not contain video information therefor, no signal is lost if a certain number of these lines are not stored in memory. Circuitry 36 is designed to recognize the occurrence of such a particular line and start the storage and/or display of the video signal thereafter. For an example of line recognition circuitry, see S. K. Kim, "VIR II System", IEEE trans. CE, Vol. CE-24, No. 3, August 78, pp. 200–208. Since the signal is stored as integral lines, and since the synchronization signals occurring at connection 39 and applied to recognition circuit 36 result from the consecutive occurrence of even and odd fields being recovered from the disc, the signal output from the storage buffers is synchronized automatically for interlacing.

FIG. 4 illustrates two arbitrarily established sets of data sequences, each data word comprising the digital representation shown in a given row under the columns designated $2^0$–$2^6$. The bits designated $2^0$–$2^6$ correspond to the output lines $2^0$–$2^6$ illustrated in FIG. 2 and the two functions described in FIG. 3. Note that the FIG. 4 normal reverse function requires a data word sequence comprised of eight words, which eight word sequence is repeated if the player is conditioned to continue to operate in that mode. Bit $2^6$ at sequence number 8 resets the counter and sequence number 9 is simply a repeat of sequence number 1 as may be recognized by observing the binary address location. Note that in the normal reverse mode shown every second field is displayed twice rather than every descending consecutive field being displayed once. In order to display consecutively descending fields once, since the pickup transducer recovers the fields in any one track in ascending order would require at least three fields of buffer storage. The skip and repeat technique permits realization of a reverse scan mode with only two fields of buffer storage. This may be made apparent from a description of the sequence illustrated in conjunction with FIG. 1. Assume in the reverse mode that the pickup transducer is tracing the information track 11 and is being stepped from the inner to the outer convolutions. Assume also that the disc 10 is rotating counterclockwise, and assume arbitrarily that the pickup transducer, just prior to sequence number 1, is over field number 17 on the disc. The address locations are represented in the figure by eight bit binary numbers rather than 10, the leftmost four bits being the most significant bits which identify the sequence. Immediately upon entering the sequence 1 period the pickup transducer is translated one groove outward from Field 18 to Field 10. Field 10 is recovered from the disc and stored in memory A while Field 14 prestored in memory B is being read out and displayed. At the end of sequence 1, the address is incremented by 1, advancing operation to sequence no. 2 and field 14 is read a second time from memory B, the transducer is now in Field 11 on the disc but Field 11 is not recorded. The system advances to sequence 3 at which time the pickup transducer recovers Field 12 which field is simultaneously recorded in memory B and displayed. Advancing to sequence number 4, Field 12 is reread from memory B and displayed a second time. The system is over Field 13 and memory A contains Field 10. Advancing to sequence 5, Field 10 is displayed from memory A, the pickup transducer is translated outward one convolution to Field 6 and Field 6 is recorded into memory B. At sequence number 6 the pickup transducer advances to Field 7 and Field 10 is displayed a second time from memory A. At sequence 7 the pickup transducer is at Field 8 which is recovered, displayed and stored in memory A. Advancing to sequence number 8 pickup transducer is over Field 9, Field 8 is redisplayed from memory A and the $2^6$ end sequence bit resets the address counter so that sequence 9 addresses the same data word as sequence 1. At sequence 9 the pickup transducer is deflected outward one convolution to Field 2, which field is recovered and stored in memory A while Field 6 is displayed from memory B, etc.

Information recorded on disc records may be derived from film source material. In this event redundant fields of information will be present due to the disparity between film frame rates and TV frame rates. To compensate for the frame rate differences, two film frames are translated into five fields of TV information as indicated in FIG. 5. Every second frame of film information is converted to two fields of TV signal and the intervening film frames are scanned thrice to form three TV fields of signal. However, two of the latter three TV fields are identical, i.e., TV Field 3 and 5 are identical as are Fields 8 and 10, 13 and 15, etc.

The redundancy imparts added complexity into the system and requires program sequencing distinct from the aforedescribed sequencing for TV source material to accomplish variable speed playback. The concepts are the same, however. Several display patterns for film source material are illustrated in tabular form in FIG. 6.

Because of the TV field redundancy of alternate film frames, it becomes necessary to identify particular frames in order to obtain the desired display results, or else redundant fields may be displayed where non-redundant fields were desired. The identification may be included in the auxilliary signals included within the recorded video signal, which identification may be used via the microprocessor to initiate a variable speed option from film source material upon the occurrence of a particular film frame, i.e., one represented by two TV fields or one represented by three TV fields. The particular field used to initiate a program sequence is a function of the display pattern chosen and is interdependent therewith. Therefore, it is necessary to identify both the source of the recorded material (TV or film) and the film frame to insure that the variable function desired is properly displayed. This information is monitored by the microprocessor to automatically direct the player to the proper set of preprogrammed sequences (TV or film) and to initiate a VSP function on the proper frame.

The parameter designations in FIG. 6 are similar to the FIG. 3 designations, save for the items listed under the column headed by "translation". The code will become obvious by explication of the first item in the column, i.e., 3R of 1 T/5 REV means that the pickup transducer is translated 3 times outwardly (reverse) by one track (per translation) every 5 revolutions of the disc.

The display modes shown in FIG. 6 are but a few of the possible operable modes and are included for illustration only. It might be noted that some of the fields, in particular ones of the display patterns are not in ascending sequence. This is a result of the field redundancy. For example, in the 2.8:1 slow forward option, that part of the field sequence denoted—2, 5, 5, 5, 3, 4,—is in fact an ascending information pattern as Field 3 and 5 have identical information content. Also note that Fields 1 and 2, and 3, 4 and 5 etc. are derived from respective common film frames fortuitously resulting in some true interlacing and increased vertical resolution over the TV source material. The TV field redundancy afforded by the film frame source material also permits realization of a greater number of speed ratios if desired.

The foregoing invention has been described with reference to a disc record having an integral number of TV fields per track convolution. However, it should be readily appreciated that the invention is equally applicable to systems which utilize disc records whereon the frames or fields are non integral per convolution and the synchronization components of signal are not angularly aligned on the disc.

What is claimed is:

1. A video disc playback apparatus capable of slow and fast motion display of TV signal recovered from a disc record having substantially parallel information track segments thereon wherein more than one frame of TV signal is stored per 360 degrees of track length and having a signal pickup transducer tracing said track and cooperating with processing circuitry for recovering said signal from said disc and further comprising:

storage means having a capacity to store substantially two fields of TV signal, said storage means having an input terminal connected for receiving said recovered signal and an output terminal connected to a first node;

read/write circuitry responsive to first control signals at control terminals thereof for conditioning said storage means to store or to output selected fields of the recovered signal;

a steering transducer responsive to second control signals applied to control terminals thereof for selectively translating the signal pickup transducer from a track currently being traced to another preselected track;

control means responsive to vertical synchronizing components of the recovered signal and to user controlled selection switches for generating at output terminals thereof, prescribed sequences of command signals at said output terminals, occurring at the vertical field rate for controlling the position of said pickup transducer and the field of TV signal currently available at said first node each time said pickup transducer encounters the beginning of a further TV signal field on said disc record; and respective means connecting specific ones of said control means output terminals to respective ones of said steering means control terminals and said read/write circuitry control terminals.

2. A video disc player for recovering signal from disc records with signal recorded on generally parallel track segments, each track segment containing more than two fields of video signal in a substantially standard television format including vertical synchronization signals, said player having a signal recovery transducer cooperating with processing circuitry and the disc record for recovering said signal therefrom and conditioning said recovered signal in a substantially standard TV signal format, said player including steering means responsive to a first control signal for radially translating said recovery transducer a predetermined number of track segments inward or outward from a track segment currently being traced by said transducer and including means for performing variable speed signal playback comprising:

first and second buffer storage means for storing and reading out selected fields of video signal, said first and second storage means having respective input terminals connected by respective means for receiving said recovered and conditioned TV signal, and having respective output terminals connected by respective means to a first node;

read/write circuitry responsive to second control signals for selecting the operable mode of said first and second buffer storage means during recovery of each signal field;

a fixed memory device containing a plurality of sequences of preprogrammed data words, each sequence defining a particular variable speed playback function, the address location of each data word in a given sequence being consecutively numbered, said fixed memory device having output means providing specific bits of each data word as said first, and second control signals; and counting means responsive to the vertical synchronization component of the recovered signal arranged for advancing said fixed memory through a sequence of memory locations at the field rate.

3. The video disc player set forth in claim 2 further including circuitry responsive to a third control signal for selectively inverting the phase of a chrominance component of signal available at said first node and wherein said fixed memory device has a further output means providing a further specific bit of each data word as said third control signal.

4. The video disc player set forth in claim 3 wherein said first and second buffer storage means are respective analog signal storage means.

5. The video disc player set forth in claim 4 wherein the respective analog signal storage means are serial CCD memory devices.

6. The video disc player set forth in claim 3 wherein the first and second buffer storage means comprise respective digital memory storage means and further includes an analog-digital converter interposed between said processing circuitry and said memory storage means and a digital-analog converter interposed between said first node and the circuitry for selectively inverting the phase of the chrominance component.

7. The video disc player set forth in claim 3 wherein said first and second buffer storage means respectively have the capacity to store an integral number of horizontal TV lines of TV signal, said respective capacities being substantially equal to one field of TV signal, said player further including timing circuitry responsive to vertical and horizontal synchronization components of signal recovered from said disc record for controlling the initiation of reading out of signal from said storage means and thereby conditioning consecutive displays of a given field of stored signal in an interlaced form.

8. The video disc player set forth in claims 2 or 3 wherein each address location comprises a number represented by N most significant address bits and M least significant address bits and wherein the N most significant address bits determine the sequence to be addressed and thereby the function to be performed, said N bits being generated subject to user program control, and the M least significant address bits being generated by said counting means for advancing through a selected sequence.

9. The video disc player set forth in claim 2 further including means for extracting recorded track and frame identification signals from the recovered signal and means for preventing the counting means from advancing the fixed memory through a particular sequence until the occurrence of one of particular ones of predetermined frame identification signals.

10. The video disc player set forth in claim 2 further including circuitry connected with said recovery transducer for processing audio components of the recorded signal and means for automatically squelching the recovered audio signal when the player is operating in other than a normal forward playback mode.

11. A video disc playback apparatus for recovering signal recorded on a disc record wherein the signal is recorded in generally parallel information track segments, said track segments containing more than one frame of video signal including vertical synchronization components, each frame being composed of two video fields, said apparatus comprising:

a base for rotatably supporting said disc record;

a signal pickup transducer arranged to trace said track segments, said pickup transducer cooperating with the disc record for recovering the recorded signal therefrom;

signal processing means connected to said pickup transducer for conditioning the recovered video signal to a substantially standard TV format;

steering means responsive to control signal applied to a control terminal thereof for repositioning said pickup transducer from one track segment currently being traced radially inward or outward a predetermined number of track segments;

first and second storage means having respective input terminals connected for receiving the conditioned TV signal, having respective output terminals connected to a first node and having respective control terminals for establishing the operable mode of the respective storage means;

circuit means connected to said first node for selectively inverting the phase angle of particular components of the recovered signal thereat, said circuit means being responsive to further signal applied to a control terminal thereof;

a fixed memory having preprogrammed data words, said words arranged in particular sequences having consecutive address locations, said fixed memory having parallel output terminals, each terminal providing an output potential corresponding to the logic state of respective bits of the currently addressed data word;

respective means connecting particular ones of said fixed memory output terminals respectively to the control terminals of said first and second storage means, the control terminal of said circuit means and the control terminals of said steering means;

user operable control means arranged to provide particular bits of each address signal to the fixed memory device;

binary counting means arranged to provide the remaining bits of each address signal to the fixed memory device, said counting means being incremented by the vertical synchronizing component of the recovered signal and causing the fixed memory to provide at the output terminals thereof, data words in a predetermined sequence and thereby to determine the video field sequence occurring at an output terminal of said circuit means.

12. The apparatus set forth in claim 11 further including means connecting a particular one of said parallel output terminals to a reset terminal of said counting means for resetting the counter to the first address after advancing through a data word sequence.

13. The apparatus set forth in claims 11 or 12 further including means for extracting track and frame identification signals from said recovered signal and means responsive to said identification signals for preventing the fixed memory from being addressed until the recovery of one of particular ones of said video fields.

* * * * *